(12) United States Patent
Backmann et al.

(10) Patent No.: US 12,222,711 B2
(45) Date of Patent: Feb. 11, 2025

(54) METHOD FOR DETERMINING MODEL PARAMETERS OF A PRODUCTION MODEL OF A FILM EXTRUSION LINE

(71) Applicant: Windmöller & Hölscher KG, Lengerich (DE)

(72) Inventors: Martin Backmann, Lengerich (DE); Markus Bussmann, Lengerich (DE); Melanie Schuh, Lengerich (DE); Lennart Ederleh, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 17/768,869

(22) PCT Filed: Oct. 8, 2020

(86) PCT No.: PCT/EP2020/078230
§ 371 (c)(1),
(2) Date: Apr. 14, 2022

(87) PCT Pub. No.: WO2021/073996
PCT Pub. Date: Apr. 22, 2021

(65) Prior Publication Data
US 2024/0094717 A1 Mar. 21, 2024

(30) Foreign Application Priority Data
Oct. 14, 2019 (DE) .................... 10 2019 127 545.8

(51) Int. Cl.
*G05B 19/418* (2006.01)
(52) U.S. Cl.
CPC .............. *G05B 19/41885* (2013.01)
(58) Field of Classification Search
CPC .. G05B 19/41885; G05B 13/042; Y02P 90/02
See application file for complete search history.

(56) References Cited

U.S. PATENT DOCUMENTS 11,493,891 B2 * 11/2022 Kurz ................... G05B 13/042
2016/0202691 A1 * 7/2016 Pettersson ........ G05B 19/41865
700/98

(Continued)

FOREIGN PATENT DOCUMENTS

DE 102016119110 10/2017
EP 1441268 7/2004

(Continued)

OTHER PUBLICATIONS

Internationaler Recherchenbericht und Schriftlicher Bescheid [International Search Report and the Written Opinion] Dated Jan. 15, 2021 From the International Searching Authority Re. Application No. PCT/EP2020/078230 and Its Translation of Search Report Into English. (13 Pages).

*Primary Examiner* — Ramesh B Patel

(57) ABSTRACT

A method for a model-based determination of model parameters (MP) of a production model (PM) of a film extrusion line, comprising:
  detecting of at least two model parameters (MP) in the form of input parameters (EP) of the production model (PM) for detecting a production situation of the film extrusion line and/or in the form of output parameters (AP) of the production model (PM) for detecting a film product situation of the film extrusion line,
  forming a parameter relationship between the acquired model parameters (MP) by means of the production model (PM),
  determining at least one further model parameter (MP) in the form of a non-detected input parameter (EP) and/or a non-detected output parameter (AP) of the production model (PM).

19 Claims, 7 Drawing Sheets

(56) References Cited

U.S. PATENT DOCUMENTS

| | | | |
|---|---|---|---|
| 2020/0047391 A1* | 2/2020 | Lettowsky | B29C 48/08 |
| 2020/0133209 A1* | 4/2020 | Kurz | B21B 37/28 |
| 2020/0139603 A1* | 5/2020 | Backmann | B29C 48/32 |
| 2021/0166181 A1* | 6/2021 | Wang | G06Q 10/20 |
| 2023/0330909 A1* | 10/2023 | Backmann | B29C 48/92 |
| 2024/0094691 A1* | 3/2024 | Backmann | G05B 13/042 |
| 2024/0094717 A1* | 3/2024 | Backmann | G05B 13/042 |
| 2024/0103461 A1* | 3/2024 | Backmann | G05B 13/042 |

FOREIGN PATENT DOCUMENTS

| | | |
|---|---|---|
| WO | WO 2017/174232 | 10/2017 |
| WO | WO 2018/072773 | 4/2018 |

\* cited by examiner

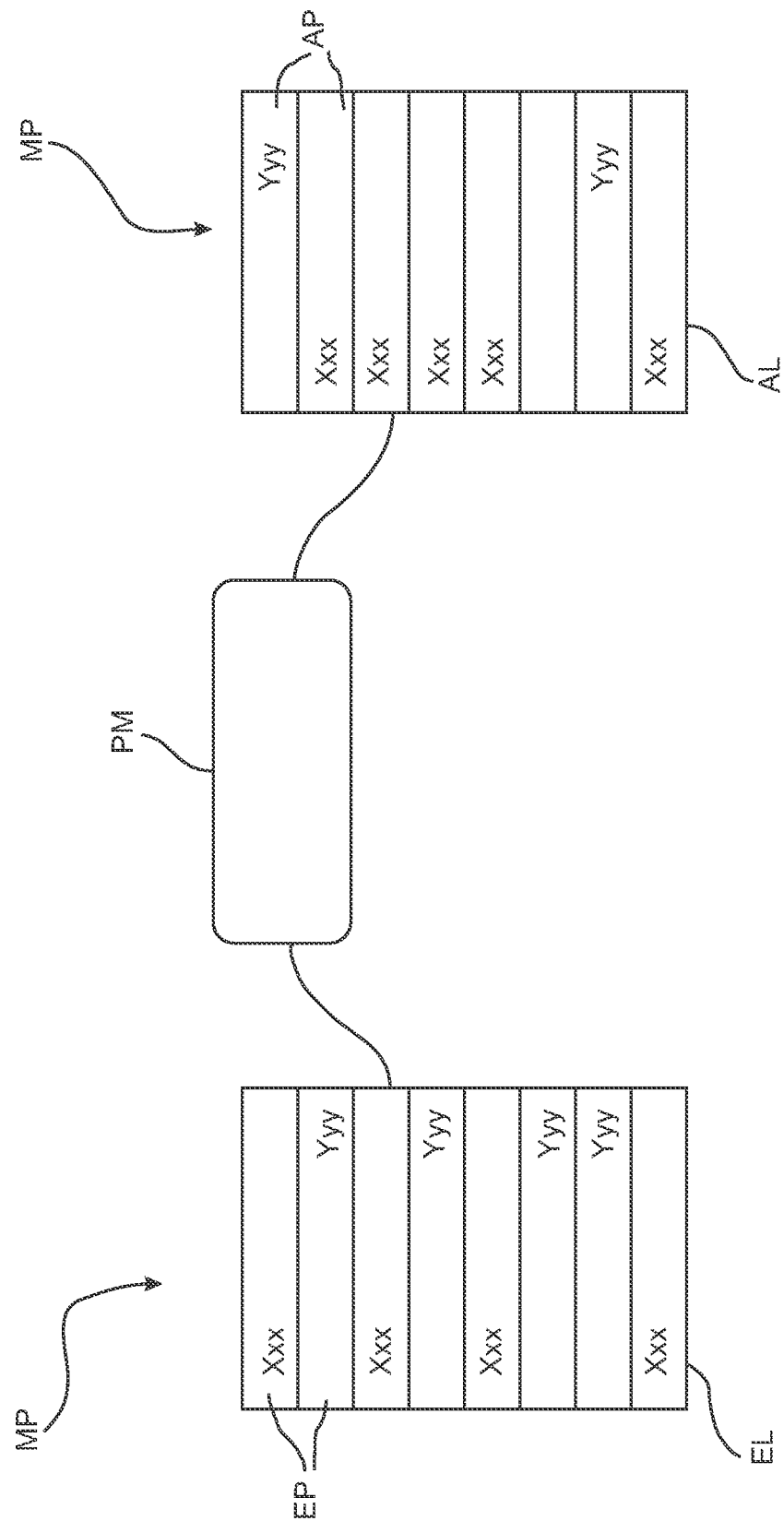

METHOD FOR DETERMINING MODEL PARAMETERS OF A PRODUCTION MODEL OF A FILM EXTRUSION LINE

RELATED APPLICATIONS

This application is a National Phase of PCT Patent Application No. PCT/EP2020/078230 having International filing date of Oct. 8, 2020, now Patent No. WO2021/073996 which claims the benefit of priority of German Patent Application No. 10 2019 127545.8 filed on Oct. 14, 2019. The contents of the above applications are all incorporated by reference as if fully set forth herein in their entirety.

FIELD AND BACKGROUND OF THE INVENTION

The present invention relates to a method for a model-based determination of model parameters of a production model of a film extrusion line, a method for creating a production model of a film extrusion line, a computer program product for performing a method for a model-based determination, and a computer program product for performing a method for creating a production model.

It is known that film extrusion line can be evaluated on the basis of input parameters and output parameters with regard to a production situation and/or with regard to a film product situation. This applies in particular to the setting, i.e. the control and/or the regulation of the film extrusion line. For example, a large number of input parameters are required to set the film extrusion line to produce a defined film product situation. Such input parameters can be, for example, parameters of the raw materials, parameters of the recipe, but also parameters of the film extrusion line itself. The evaluation of the quality of the film product also depends on a large number of parameters. For example, the initial parameter here can be the output parameter, i.e. the actual fulfillment of a function of the film, but also measurable film parameters such as tear strength or stretchability.

Known solutions are based to a large extent on the experience and knowledge of the operating personnel for the control and/or regulation of the film extrusion line. Thus, based on the experience of the operating mode of the film extrusion lines, the operating personnel know which settings have to be made in order to achieve a defined film product or to change, in particular improve, individual result parameters in the film product situation. However, this leads to the fact that with different operating personnel also different and above all not reworkable processes lead to the fact that different film product situations arise. Although this is usually still sufficient in principle to ensure a sufficient level of quality for the film product, a high reject rate is achieved in the event of an error. Especially when switching between different film products, but also when changing operators, there is therefore a high risk that the film product will change in terms of production quality.

SUMMARY OF THE INVENTION

It is therefore the object of the present invention to at least partially eliminate the disadvantages described above. In particular, it is the task of the present invention to provide an improved, in particular a reworkable, means of influencing the production process in a cost-effective and simple manner.

The preceding object is solved by a method device with the characteristics of claim 1, a method with the characteristics of claim 9, a container computer program with the characteristics of claim 15 and a computer program product with the characteristics of claim 16. Further characteristics and details of the invention result from the dependent claims, the description and the drawings. In this context, features and details explained in connection with the method for determination according to the invention naturally also apply in connection with the method for production according to the invention, the computer program product for determination according to the invention, and the computer program product for production according to the invention, and vice versa in each case, so that reference is or can always be made mutually with respect to the disclosure concerning the individual aspects of the invention.

According to the invention, a method of a model-based determination of model parameters of a production model of a film extrusion line is used. Such a method has the following steps:

detection of at least two model parameters in the form of input parameters of the production model for detecting a production situation of the foil extrusion plant and/or in the form of output parameters of the production model for detecting a film product situation of the film extrusion line, forming a parameter relationship between the acquired model parameters by means of the production model, determining at least one further model parameter in the form of a non-detected input parameter and/or a non-detected output parameter of the production model.

A method according to the invention is now used to determine model parameters on the basis of a production model of a film extrusion line. Such a production model can be, for example, an algorithmic model. However, more complex models, as will be explained later, are also applicable using so-called neural networks, i.e. using so-called artificial intelligence. According to the invention, the production model is able to establish a correlation between at least two model parameters of the film extrusion line. It is irrelevant for the first step whether, when carrying out a method according to the invention, the two model parameters are both input parameters, both output parameters or both, i.e. input parameters and output parameters. According to the invention, the method can be used to base further control, in particular a control intervention, on this relationship in a control situation on a film extrusion line. This can be done as follows.

In a first step according to the invention, at least two model parameters are acquired. Of course, three or more model parameters can also be captured in this step, which complicates the following task only to a small extent, since the correlation and thus the complexity of the relationships are stored in the production model. For example, if two input parameters are selected as model parameters, a raw material parameter and a plant parameter can be selected as input parameters. For example, the stability of production in the form of the plant parameter can now be determined in advance as a function of at least one or more raw material parameters, since the formation of a parameter relationship between these two detected model parameters now makes it possible to determine at least one further model parameter. It is therefore possible, on the basis of the raw material parameters and, for example, of a plant parameter, to determine further parameters, for example process parameters, in particular, for example, a pressure value or a temperature value in the film extrusion line, without having to carry out an actual measurement for this purpose.

As the preceding example makes clear, the entire complexity of a film extrusion line can now be represented in a production model of this film extrusion line. In the simplest case, this is the correlation between at least two model parameters. Preferably, however, the production model is capable of relating a variety of different model parameters for the film extrusion line to one another. This makes it possible to use specific and, above all, easily accessible measurement data, for example variables such as pressure or temperature as well as flow velocities, to draw conclusions about parameters that are less easy to measure or that could previously only be estimated. How and in which way such a production model can be created will be explained in more detail later.

Using a production model in a process according to the invention, it is now possible to achieve high quality film products with the film extrusion line regardless of the level of knowledge and experience of the operators. In particular, it is possible in this way to automate the control of the film extrusion line at least partially, and preferably even completely or substantially completely. Thus, it is now possible to carry out the method according to the invention not only for one parameter relationship between two model parameters, but for any desired number of parameter relationships, and in particular to base an optimization run on the method in an automated manner. In other words, using the production model, the film extrusion line can now be operated in an automated and, moreover, even in an improved or optimized manner.

In addition to the optimization and automation of the film extrusion line described above, another decisive advantage of the process according to the invention is its reworkability. Thus, using the production model can ensure that the same model parameters will produce the same desired results. This is especially the case when a correlation is generated between model parameters in the form of input parameters and model parameters in the form of output parameters.

It can therefore be summarized that complex relationships, which were previously only reproducible through the experience and knowledge of the operating personnel, can now be automatically recorded and, through the use of the production model, can be used in the control or regulation and thus in the control of the film extrusion line.

For the implementation of a process according to the invention, it is irrelevant whether this takes place inline, so to speak, i.e. during the operation of the film extrusion line, or offline before or after the operation of the film extrusion line. Inline use can be for direct control of the film extrusion line in a controlling and/or regulating manner. In an offline use of the method according to the invention, a prediction can be made, for example, whether and in which way which film quality is achievable at all as a film product situation with which input parameters as model parameters. This makes it possible not only to define the basic manufacturing capability but also, in particular, to create an automatic record of basically possible product variants in an optimized manner.

Starting from the known solutions, which are essentially based exclusively on the knowledge and experience of the operators, a process according to the invention can now significantly improve the automation, the optimization and, moreover, the actual use of the film extrusion line.

There may be advantages if, in a method according to the invention, the model parameters in the form of input parameters are at least one of the following:
Raw material parameters
Economic parameters
Recipe parameters
Plant parameters
Process parameters
Machine parameters
Secondary parameters
Film layer parameters
Productivity parameters The above list is not exhaustive. Raw material parameters can be, for example, the density, grain size or similar of the granular raw material. Economic parameters can be model parameters in the form of the price of the raw material, the corresponding stock situation, i.e. whether there is a lot or little quantity of this raw material, or similar. A formulation parameter is understood to mean, for example, the weight proportions or the volume proportions of the individual raw materials within the formulation. For the purposes of the present invention, plant parameters are to be understood as specific parameters precisely at the specific film extrusion line. This must be distinguished from process parameters that can also be measured on the film extrusion line, for example pressure, temperature, volume flow or similar measurable, in particular physical, variables. Machine parameters, for example speed, heating power or electrical power consumption, can also be used as model parameters. Of course, secondary parameters can also be used, which can be recorded next to or in the vicinity of the film extrusion line. This can be, for example, the hall temperature, a state of contamination or vibrations. Film layer parameters can also be used as model parameters. In particular, this is the influence of mutually adjacent layers of the film product. Last but not least, it is also conceivable to use productivity parameters, for example the efficiency of the plant in terms of energy yield or film production, as model parameters.

It is further advantageous if, in a method according to the invention, the model parameters in the form of the output parameters are at least one of the following commerce:
Film parameters
Usage parameters
Further processing parameters The above list is also not exhaustive. A film parameter may mean, for example, the tensile strength or stretchability of the resulting film product. Such film parameters can be measured, in particular, directly or by means of tests. Usage parameters, i.e. the actual use of the film product, can also be used as model parameters. For example, the tearability can be understood as a film parameter in the form of the usage parameter in such a way that it is tested whether a suitably manufactured bag tears or remains firmly together. Further processing parameters, such as the tensile force in the case of a transport film when this transport film is wound, can also be used in accordance with the invention.

Further advantages can be gained if, in a method according to the invention, the model parameters are recorded in the form of the input parameters as an input list and/or the model parameters are recorded in the form of the output parameters as an output list of the production model. The input list and/or the output list thus form defined interfaces for the communication of the data with the production model. This means that, especially in the case of complex determination tasks with a large number of model parameters, these individual data are recorded in lists and can thus be clearly assigned. This list-like data interface thus allows simplified communication with actual measurement methods, but also with manual data entry for individual model parameters.

It is also advantageous if, in a method according to the invention, a neural network of the production model is used in the formation of the parameter relationship between the detected model parameters and/or in the determination of the non-detected model parameters. In particular, the production model is essentially based entirely on a neural network. Such a neural network, in the sense of the present invention, is a combination of nodes and weighted connections between the nodes, with simple mathematical operators implemented at each of these nodes in a prioritized manner. In other words, the production model is at least partially formed as artificial intelligence. However, combinations with normal algorithms and/or with empirical boundary conditions are of course also conceivable.

A further advantage can be achieved if, in a process according to the invention, the formation of the parameter relationships via the production model is bidirectional, in particular multidirectional. This means that the production model can create parameter relationships not only from defined input parameters to defined output parameters, but at least vice versa. For particularly complex tasks with three or more model parameters, a multidirectional parameter relationship is especially conceivable, so that it is irrelevant for the execution of the method which model parameters can be determined exactly and which are to be generated by the parameter relationship of the production model. Thus, both the acquisition of model parameters and the determination of model parameters are essentially open in all directions, so that a universal network is available for any acquisition possibilities, any questions and any determination tasks to the method according to the invention.

It is furthermore advantageous if, in a method according to the invention, the acquired model parameters are at least partially prioritized, in particular depending on the non-acquired model parameters to be determined. This prioritization can be stored in the production model. However, such prioritizations can also be set manually. The prioritization of model parameters can be present both on the acquisition side and on the determination side, i.e. the output side of the production model. The prioritization allows for different weightings to be provided so that certain model parameters can be weighted more or less heavily with respect to the corresponding determination task. For example, if transparency as a property of a film product is of very high importance, the corresponding transparency parameter can be assigned a high priority as a model parameter. For example, if production stability is important in another application situation, an associated production parameter or process parameter of the film extrusion line can be introduced into the production model with correspondingly increased prioritization.

It is also advantageous if, in a method according to the invention, at least some external parameters from an external plant are used as model parameters in the form of input parameters, the external parameters being normalized to the production model before the parameter relationship is formed. Such a third-party line can be an identical line, but also a different film extrusion line. Through standardization, different sensor protocols can also be standardized and implemented for the film extrusion line to be used and thus be usable. Of course, the reverse direction is also conceivable, so that an extraction is possible from a process according to the invention, which can be transferred to other external plants. This makes it possible, for example, to carry out the process according to the invention with so-called cloud systems not only within a single film extrusion line, but also across distributed film extrusion lines, even across film extrusion lines with different geographical locations. In this way, it is also possible to quickly integrate the process into the running operation of newly installed film extrusion lines. Last but not least, in this way a learning capability and thus a feedback for the production model can be provided not only within the film extrusion line, but across an entire machine park.

Also an object of the present invention is a method for creating a production model of a film extrusion line for use in a method for determining according to the invention. Such a method has the following steps:
Capture model parameters in the form of input parameters of the production model,
Capture associated model parameters in the form of output parameters of the production model,
Determine a parameter relationship between the acquired input parameters and the acquired output parameters,
Saving the determined parameter relationship in the production model.

By creating and thus by providing the possibility of using a method according to the invention for determination, the correspondingly same advantages are achieved as have been explained with regard to the main method. In principle, the production model can be stored and thus created algorithmically, empirically, as artificial intelligence, or as any combination of such solutions. The relationship and the weighting between the individual nodes can be possible in an automated way, for example by a so-called deep learning method. The acquisition of the model parameters is used in particular for a real film extrusion line. Real data can therefore form the basis for generating a production model. The production model can be generated as a specific, i.e. plant-specific, production model for exactly one film extrusion line. However, it is also conceivable in principle to generate a higher-level, i.e. general, production model for one type of film extrusion line.

Advantages can be gained if, in a production process according to the invention, the steps are carried out repeatedly, in particular at least in part, during the ongoing production process of the film extrusion line. The repeated execution of the creation process allows, so to speak, to perform a construction and a creation of the production model on the running film extrusion line. In this way, operator interventions can also be monitored in a manual manner and stored in the production model. This discarding is based not only on the interventions, but also on the results that occur as a result of these interventions. In addition or alternatively, laboratory values can of course be used to contribute to the acquisition of model parameters.

Furthermore, it is advantageous if, in a method according to the invention, already existing historical data are used for the steps of acquisition. For example, data memories of film extrusion lines already in operation can be read out. So, from such old film extrusion lines, the data can be used to provide a learning procedure for a production model with a large amount of data. Empirical information and/or physically known relationships can also be considered here. The whole can be additionally supplemented with training data from an inline measuring process and/or an offline measuring process of the film extrusion line. All this is used in particular for training an artificial intelligence, for example in the form of a neural network for the production model.

Furthermore, it is advantageous if parameter relationships already stored in the production model are at least partially overwritten or changed during a creation process according to the invention. Overwriting in the case of new contexts or further development on the basis of new training data means that the production model is not just created once, but can develop itself further as a self-learning system, so to speak.

In particular, wear or other parameters that change over the service life can be taken into account in this way and automatically stored in the production model.

It is also advantageous if, in a method according to the invention, the step of storing in a general production model is performed to form a specific production model. For example, a general production model can be created for one type of film extrusion line when a specific production model is applicable to exactly one specific film extrusion line. Such a general production model can also be called a startup model, with which the operation can start.

Over the course of operation, this general production model will evolve into a specific production model for this particular film extrusion line by partially overwriting the parameter relationships.

It is also advantageous if at least one of the following is used in an acquisition method according to the invention for acquiring the model parameters:

Laboratory values
Feedback from customers
Feedback from users

The above list is not exhaustive. In particular, these are so-called offline influences, which cannot be determined directly on the film extrusion line. In a manual, but also in an automated way, such offline influences can also be fed back into the film extrusion line and thus into the general and/or into the specific production model. This makes it possible to represent complex model parameter relationships in the production models as well.

Another object of the present invention is a computer program product comprising instructions which, when the program is executed on a computer, cause the computer to perform the steps of a determination procedure according to the invention.

Also an object of the present invention is a computer program product comprising instructions which, when the program is executed on a computer, cause the computer to perform the steps of an acquisition process according to the invention.

BRIEF DESCRIPTION OF THE SEVERAL VIEWS OF THE DRAWINGS

Further advantages, features and details of the invention are given in the following description, in which, with reference to the drawings, embodiments of the invention are described in detail. The features mentioned in the claims and in the description may be individually or in any combination substantially inventive.

The accompanying drawings are schematic representations, in which:

FIG. 7 shows another use of input lists and output lists.

DESCRIPTION OF SPECIFIC EMBODIMENTS OF THE INVENTION

Figure 1:
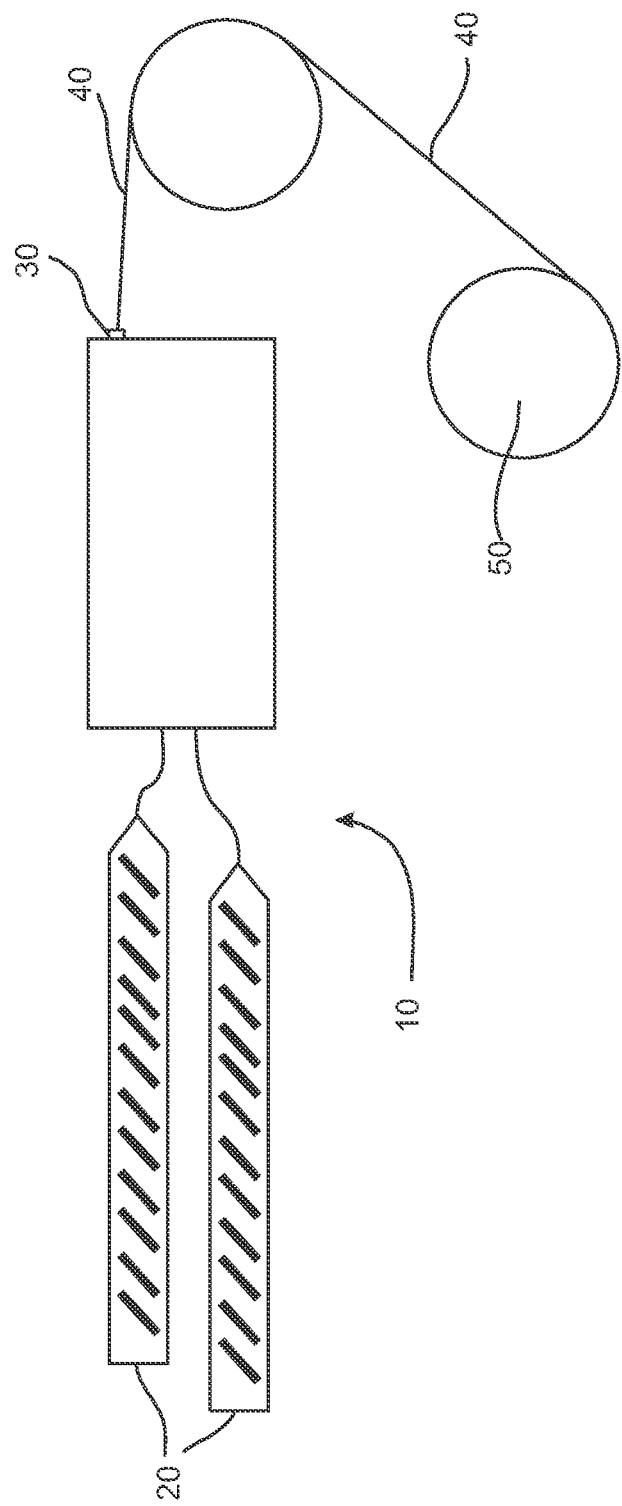
FIG. 1 shows an embodiment of a film extrusion line according to the invention.
Figure 2:
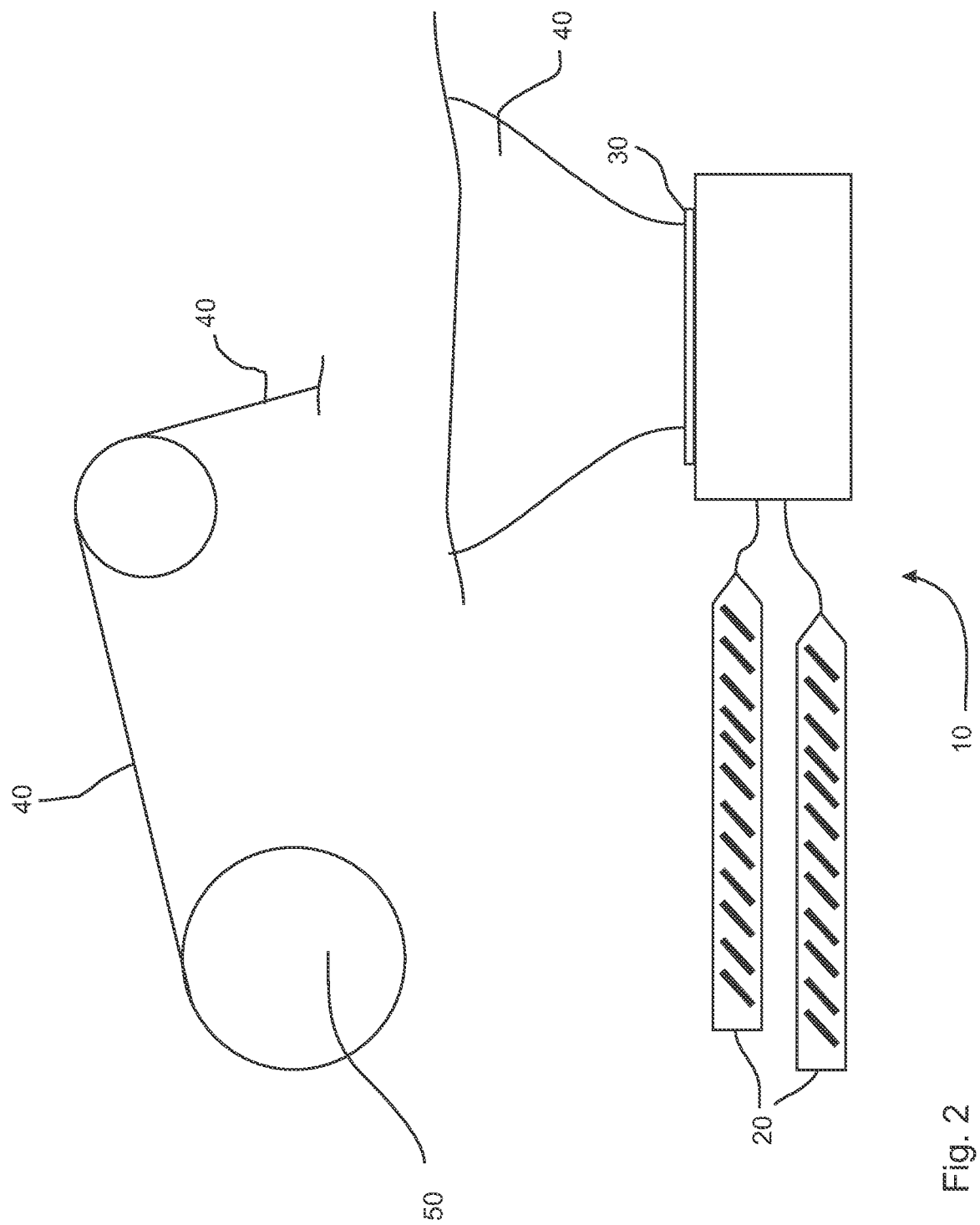
FIG. 2 shows a further embodiment of a film extrusion line according to the invention.

FIG. 1 schematically shows a first film extrusion line 10. This is equipped with two extruders 20, which provide molten extrusion material in a nozzle 30. This embodiment of the film extrusion line 10 is schematically a flat film line, in which the film sheet 40 is placed on a cooling roll via the nozzle 30 and is drawn off via a winding roll 50. Alternatively, it is also possible, as shown for example in FIG. 2, to design the film extrusion line 10 as a blown film extrusion line, in which case two extruders 20 are also provided schematically. The nozzle 30 is provided as an annular nozzle, wherein a bubble-shaped film sheet 40 is inflated. After the film sheet 40 has been laid flat and folded over, it is also wound up on top of a winding roll 50.

Figure 3:
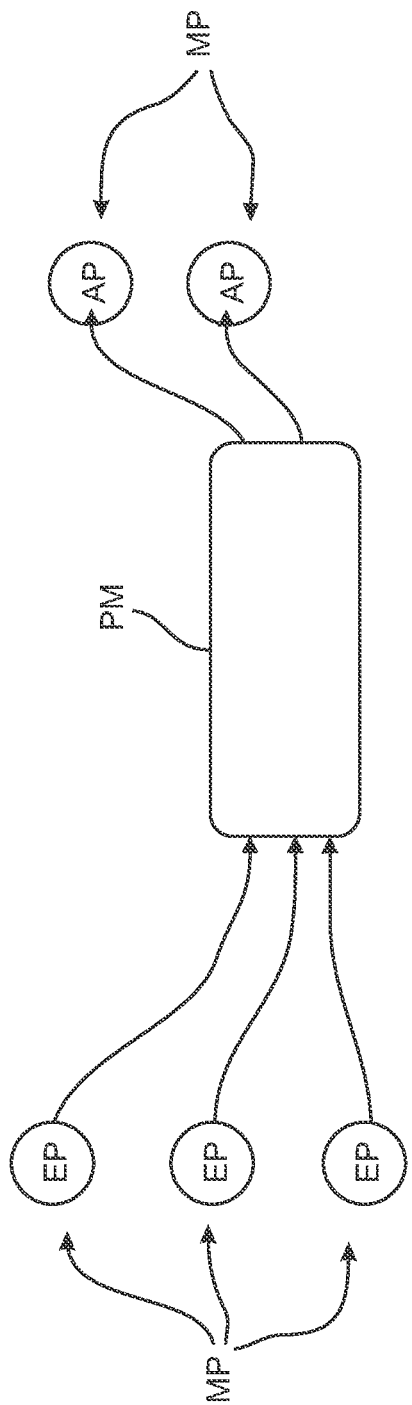
FIG. 3 shows a possible parameter relationship.
Figure 4:
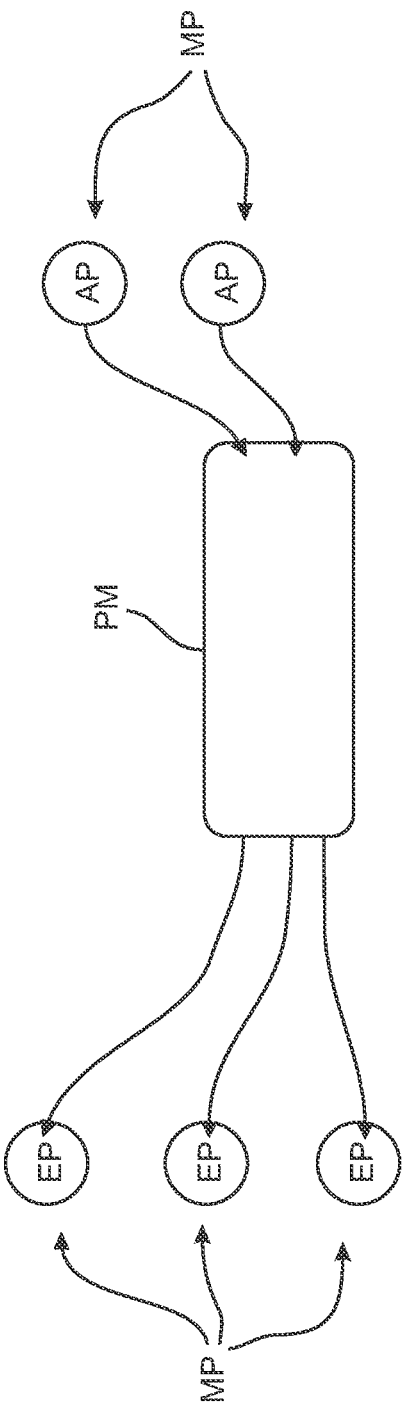
FIG. 4 shows another possible parameter relationship.

FIGS. 3 and 4 now show schematically how possible correlations with a production model PM according to the invention are adjustable. Here it can be seen well that a bidirectional determination is possible. FIG. 3 shows, for example, how three input parameters EP are stored as model parameters MP in the production model PM. The parameter relations created in it now generate as output two output parameters AP, which are available as model parameters MP for further use. These output parameters AP can now be used directly to control the film extrusion line 10. However, further evaluation, in particular manual evaluation, is also conceivable.

FIG. 4 shows the reverse solution to FIG. 3. Here the output parameters are AP model parameters with which the production model PM is fed. The output from the production model PM are now here three input parameters EP as model parameters MP. Of course, the variants of FIGS. 3 and 4 can also be combined with each other, so that not only a bidirectional, but in particular a multidirectional parameter relationship between a large number of different model parameters MP is possible in a process according to the invention.

Figure 5:
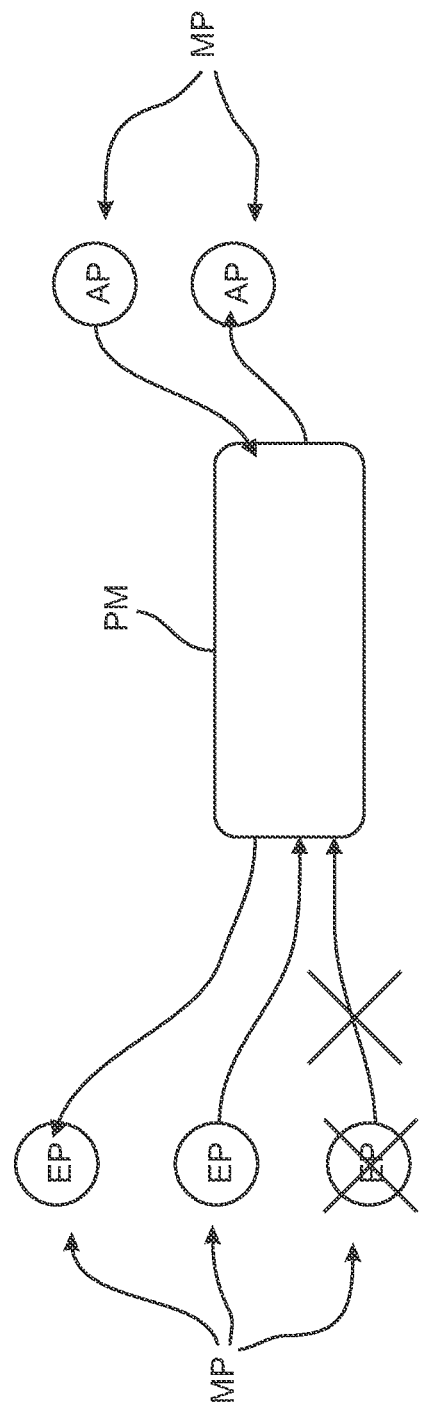
FIG. 5 shows another possible parameter relationship.

FIG. 5 shows how an input parameter EP can be actively deleted from an input situation via prioritization. Also shown here is a multidirectional relationship, with an input parameter EP and an output parameter AP as output from the production model. The input is from again another input parameter EP and another output parameter AP.

Figure 6:
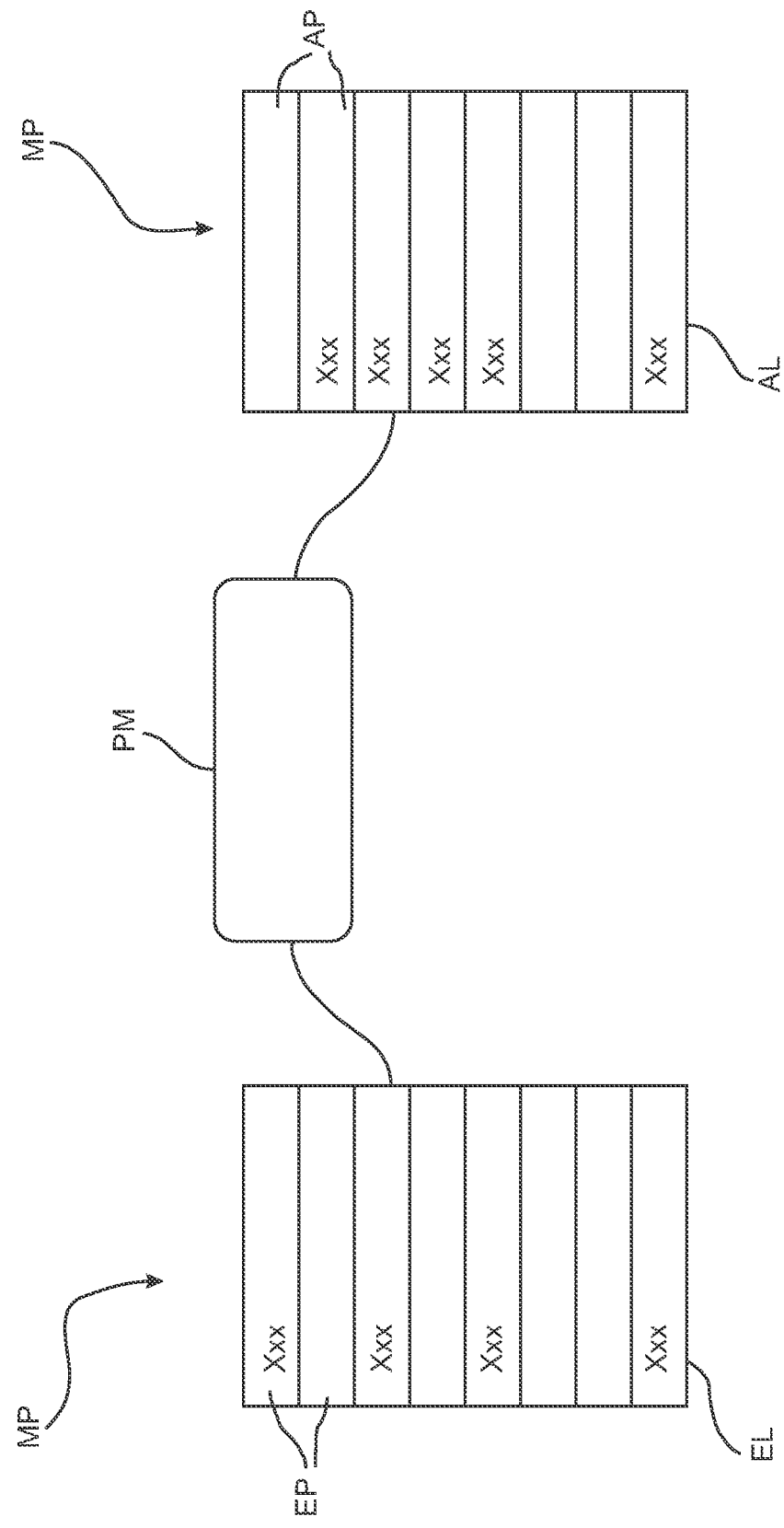
FIG. 6 shows the use of input lists and output lists.
Figure 10:
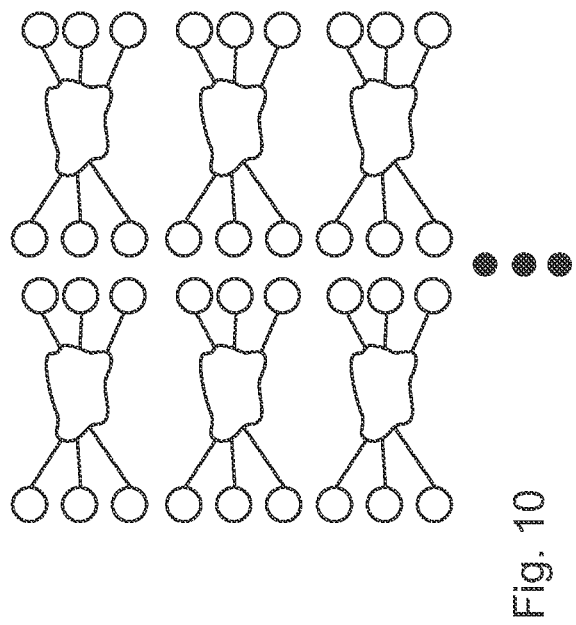
FIG. 10 shows a further step in the creation of a model according to the invention.
Figure 11:
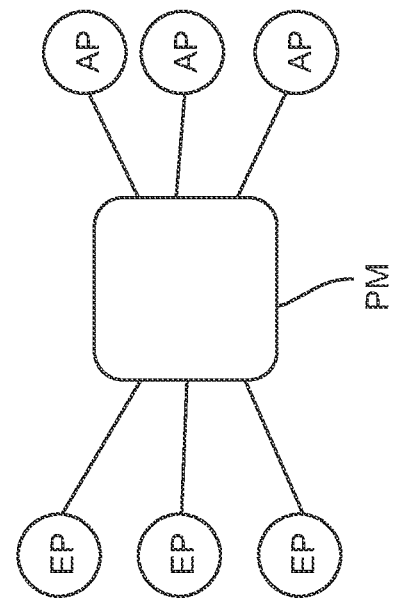
FIG. 11 shows the created model according to the invention.
Figure 8:
FIG. 8 shows a first step in the creation of a model according to the invention.
Figure 9:
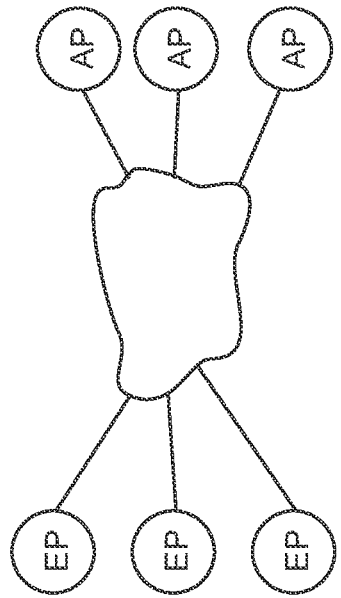
FIG. 9 shows another step in the creation of a model according to the invention.

In order to create simple interfaces for a larger number of model parameters MP, FIGS. 6 and 7 show the possibility of using input lists EL and output lists AL, in which the corresponding input parameters EP and output parameters AP are entered. FIG. 6 shows the initial situation, with the individual parameter data represented by XXX. As soon as these existing and acquired data of the model parameters MP from the input list EL and output list AL have been stored into the production model PM, the created parameter relations now generate the corresponding outputs in a complex way, so that the input list EL and the output list AL, here represented with YYY, are supplied with the corresponding output data values. In other words, a multidirectional relationship is used here by the production model PM to generate a completion of both the input list EL and the output list AL based on a complex input situation into the production model PM.

FIGS. 8 to 11 show one way of creating such a production model PM. In the starting point, input parameters EP and output parameters AP are recorded, which are now correlated with first parameter relationships according to FIG. 9. This is done repeatedly with a high frequency, as shown schematically in FIG. 10, so that the parameter model PM is formed and solidified via the empirical parameter relationships of a large number of generated parameter relationships. This can also be referred to as deep learning or training the AI for an artificial intelligence for production model PM.

The preceding explanation of the forms of embodiments describes the present invention exclusively in the context of embodiments. Of course, individual features of the embodiments can be freely combined with each other, if technically reasonable, without leaving the scope of the present invention.

REFERENCE SIGN LIST

10 Film extrusion line
20 Extruder
30 Nozzle
40 Film sheet
50 Winding roll
PM Production model
MP Model parameter
EP Input parameter
EL Input list
AP Output parameters
AL Output list

What is claimed is:

1. A method for automating a control or a regulation of a film extrusion line, comprising:
    detecting at least two model parameters which are:
        (a) input parameters of a production model for detecting a production situation of the film extrusion line, or
        (b) output parameters of the production model for detecting a film product situation of the film extrusion line,
    forming a parameter relationship between the at least two model parameters through the production model,
    determining, based on the parameter relationship, at least one further model parameter in a form of a non-detected input parameter or a non-detected output parameter of the production model,
    automating a control or a regulation of the film extrusion line using the at least one further model parameter,
    wherein the model parameters in the form of input parameters are at least one of the following: raw material parameters, recipe parameters, plant parameters, machine parameters, and film parameters.

2. The method according to claim 1, wherein the model parameters in the form of input parameters are at least one of the following:
    economic parameters
    process parameters
    secondary parameters
    productivity parameters.

3. The method according to claim 1, wherein model parameters in the form of output parameters are at least one of the following:
    film parameters
    usage parameters
    further processing parameters.

4. The method according to claim 1, wherein at least the model parameters in the form of the input parameters are recorded as an input list or the model parameters in the form of the output parameters are recorded as an output list of the production model.

5. The method according to claim 1, wherein a neural network of the production model is used at least in forming the parameter relationship between the detected model parameters or in determining the non-detected model parameters.

6. The method according to claim 1, wherein the formation of the parameter relationships via the production model is bidirectional.

7. The method according to claim 6, wherein the formation of the parameter relationships via the production model is multidirectional.

8. The method according to claim 1, wherein the detected model parameters are at least partially prioritized.

9. The method according to claim 8, wherein the detected model parameters are at least partially prioritized as a function of the non-detected model parameters to be determined.

10. The method according to claim 1, wherein at least in part external parameters from an external plant are used as model parameters in the form of input parameters, wherein the external parameters being normalized to the production model before the parameter relationship is formed.

11. The method of claim 1, further comprising:
    capturing model parameters in the form of input parameters of the production model,
    capturing associated model parameters in the form of output parameters of the production model,
    determining a parameter relationship between the acquired input parameters and the acquired output parameters,
    saving the determined parameter relationship in the production model.

12. The method according to claim 11, wherein the steps are carried out repeatedly in the ongoing production process of the film extrusion line.

13. The method according to claim 12, wherein the steps are carried out repeatedly at least partially, in the ongoing production process of the film extrusion line.

14. The method according to claim 11, wherein already existing historical data are used for the steps of acquisition.

15. The method according to claim 11, wherein parameter relationships already saved in the production model are at least partially overwritten or changed.

16. The method according to claim 11, wherein the step of storing in a general production model is performed to form a specific production model.

17. The method according to claim 11, wherein for the at least two model parameters are acquired using at least one of:
    laboratory values
    feedback from customers
    feedback from users.

18. A computer program product comprising instructions which, when the program is executed on a computer, cause the computer to perform the steps of a method having the features of claim 11.

19. A computer program product comprising instructions which, when the program is executed on a computer, cause the computer to perform the steps of a method having the features of claim 1.

* * * * *